(12) United States Patent
Wang

(10) Patent No.: US 8,357,003 B1
(45) Date of Patent: Jan. 22, 2013

(54) DOUBLE-LAYER CARD EDGE CONNECTOR

(75) Inventor: Yong Fu Wang, Guangzhou (CN)

(73) Assignee: Lotes Co., Ltd., Keelung (TW)

( * ) Notice: Subject to any disclaimer, the term of this patent is extended or adjusted under 35 U.S.C. 154(b) by 0 days.

(21) Appl. No.: 13/298,536

(22) Filed: Nov. 17, 2011

(30) Foreign Application Priority Data

Sep. 1, 2011 (CN) .................... 2011 2 0331330 U

(51) Int. Cl.
*H01R 13/62* (2006.01)
(52) U.S. Cl. ....................................... 439/327
(58) Field of Classification Search ........... 439/327, 439/328
See application file for complete search history.

(56) References Cited

U.S. PATENT DOCUMENTS

| | | | |
|---|---|---|---|
| 5,484,302 A * | 1/1996 | Yamada et al. ........... | 439/326 |
| 7,134,896 B1 * | 11/2006 | Chen ........................ | 439/326 |
| 2007/0099470 A1 * | 5/2007 | Yang et al. ............... | 439/326 |
| 2012/0164864 A1 * | 6/2012 | Kato ........................ | 439/327 |

* cited by examiner

*Primary Examiner* — Gary F. Paumen
(74) *Attorney, Agent, or Firm* — Morris Manning & Martin LLP; Tim Tingkang Xia, Esq.

(57) ABSTRACT

The invention relates to a double-layer card edge connector includes an electrical connection base and at least one latch member. The latch member has a first main arm and a second main arm arranged in an upper-lower and front-rear manner. A first slit exists between the first main arm and the second main arm. The first main arm includes a first downward pressing portion disposed at a free end of the first main arm and pressing a first electronic card, and a first clamping portion formed through extending from the second main arm and preventing the first electronic card from moving forward. The second main arm includes a second downward pressing portion and a second clamping portion disposed at a free end of the second main arm. The second downward pressing portion presses a second electronic card downward and prevents the second electronic card from moving forward.

10 Claims, 7 Drawing Sheets

DOUBLE-LAYER CARD EDGE CONNECTOR

CROSS-REFERENCE TO RELATED APPLICATION

This non-provisional application claims priority under 35 U.S.C. §119(a) on Patent Application No. 201120331330.0 filed in P.R. China on Sep. 1, 2011, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to a double-layer card edge connector, and more particularly to a card edge connector for electrically connecting a first electronic card and a second electronic card to a circuit board.

BACKGROUND OF THE INVENTION

As an example of conventional single-layer card edge connectors, Chinese Patent No. CN200410001481.4 discloses a single-layer metal ear clip for fixing an electronic card. The single-layer metal ear clip is integrally formed by stamping a metal plate, and thus has desirable overall elasticity and strength.

However, with the development of science and technology, the information amount transmitted and processed by electronic products increases, and therefore, multiple single-layer card edge connectors need to be disposed on a current circuit board. Meanwhile, as electronic products are developing toward integration and miniaturization, the dispersedly disposed multiple single-layer card edge connectors that occupy a large area on the circuit board cannot meet the increasing requirements for the development toward integration and miniaturization. Therefore, a double-layer card edge connector is developed accordingly.

In the double-layer card edge connector, in order to ensure the overall strength of an upper layer ear clip and a lower layer ear clip, the upper and lower layer ear clips usually adopt a plastic member integrally formed with an insulating body, or adopt a plastic member fitted to a metal member to stop and fix two electronic cards. For example, U.S. Pat. No. 6,095,827 discloses a double-layer card edge connector, which adopts a two-piece latch member formed by the plastic member and the metal member to stop and fix two electronic cards. Although the two-piece latch member can desirably stop and fix the two electronic cards, it has obvious defects as follows.

1. Complicated structure. While ensuring that the two-piece latch member has a basic structure of the ear clip, that is, includes a downward pressing structure for pressing the electronic card downward and a clamping and positioning structure for fastening the electronic card, the fitting relationship between the metal member and the plastic member also needs to be considered. Therefore, a complicated fastening structure needs to be disposed on the metal member for fitting to the plastic member. Accordingly, a complicated accommodating groove needs to be disposed on the plastic member to accommodate and fix the metal member. As a result, the structure of such a two-piece latch member is complicated.

2. High cost. In the two-piece latch member, the metal member is formed by stamping and forming, and the plastic member and the insulating body are formed by integral plastic molding. It can be known that structures of the two structural members are complicated. Therefore, the stamping process needs to be performed many times, and a mold jig having a complicated structure is required for plastic molding, which leads to a high cost for producing the latch member.

Therefore, a heretofore unaddressed need exists in the art to address the aforementioned deficiencies and inadequacies.

SUMMARY OF THE INVENTION

In one aspect, the present invention is directed to a double-layer card edge connector having a one-piece metal latch member with a simple yet novel structure and low cost while ensuring a function for positioning and fixing a first electronic card and a second electronic card.

In one embodiment, a double-layer card edge connector for receiving a first electronic card and a second electronic card therein according to the present invention includes: an electrical connection base, formed with a first slot and a second slot from top to bottom in sequence for respectively receiving and fixing the first electronic card and the second electronic card therein; and at least one latch member, fixed at one end of the electrical connection base, in which the latch member includes a fixing end fixed inside the electrical connection base, a first main arm and a second main arm extend forward from the fixing end from top to bottom in sequence, a first slit exists between the first main arm and the second main arm, and a free end of the first main arm is located closer to the electrical connection base than a free end of the second main arm is. The first main arm includes a first downward pressing portion disposed at the free end of the first main arm and pressing the first electronic card downward, and a first clamping portion formed through extending from the second main arm and located behind the first downward pressing portion. The first clamping portion is clamped in the first electronic card to prevent the first electronic card from moving forward. The second main arm includes a second downward pressing portion and a second clamping portion disposed at the free end of the second main arm. The second downward pressing portion presses the second electronic card downward. The second clamping portion is clamped in the second electronic card to prevent the second electronic card from moving forward.

Further, the second main arm includes an upper extending plate and a blocking arm distributed in an upper-lower manner. The free end of the first main arm is located closer to the electrical connection base than a free end of the blocking arm is. The second downward pressing portion and the second clamping portion are both disposed at the free end of the blocking arm. The upper extending plate extends forward, and then is bent backward and extends to form the bent blocking arm. A tail end of the bent blocking arm is higher than a lower edge of the first main arm and is located at an outer side of the first main arm, so as to prevent the first main arm from being bent outward excessively. A through hole is formed through the blocking arm and the upper extending plate. A first clamping portion for preventing the first electronic card from moving forward is formed through extending from the upper extending plate along an upper edge of the through hole toward the other end of the electrical connection base and then extending upward. The first clamping portion includes a root portion connected to the upper edge of the through hole, a connecting portion formed through extending from the root portion toward the other end of the electrical connection base, and the first positioning portion formed through extending upward from the connecting portion. The root portion and the through hole have at least one gap in front and rear directions. The first positioning portion is fitted to a positioning hole of the first electronic card, so as to prevent the first electronic card from moving forward. The first positioning portion gradually shrinks from bottom to top, so as to guide the positioning hole to be fitted to the first positioning portion. The number of the latch members is two. The two latch members are symmetrically disposed at two ends of the electrical connection base. The second main arm further includes a lower extending plate below the blocking arm. An second slit exists between the lower extending plate and the blocking arm. A lower edge of the lower extending portion extends in a horizontal direction to form a soldering portion. A fixing end includes a first fixing portion and a second fixing portion arranged in an upper-lower manner. An end of the electrical connection base is disposed with a first accommodating groove and a second accommodating groove for receiving and fixing the first fixing portion and the second fixing portion correspondingly. The first fixing portion and the first accommodating groove are in clearance fit, and the second fixing portion and the second accommodating groove are in clearance fit.

In the present invention, the latch member stops and fixes the first electronic card through the following structure: the first downward pressing portion is disposed at the free end of the first main arm to press the first electronic card, and a first clamping portion formed through extending from the second main arm and located behind the first downward pressing portion is clamped in the first electronic card, so as to prevent the first electronic card from moving forward. Meanwhile, the latch member stops and fixes the second electronic card through the following structure: the second downward pressing portion and the second clamping portion are disposed at the free end of the second main arm to respectively press the second electronic card downward, and prevent the second electronic card from moving forward.

While ensuring that the first electronic card and the second electronic card are stopped and fixed, the latch member adopts a one-piece metal member structure, and therefore, the structure is simple yet novel. In addition, as the latch member can be integrally formed simply by stamping and forming a metal plate during manufacturing, the processing cost is low.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
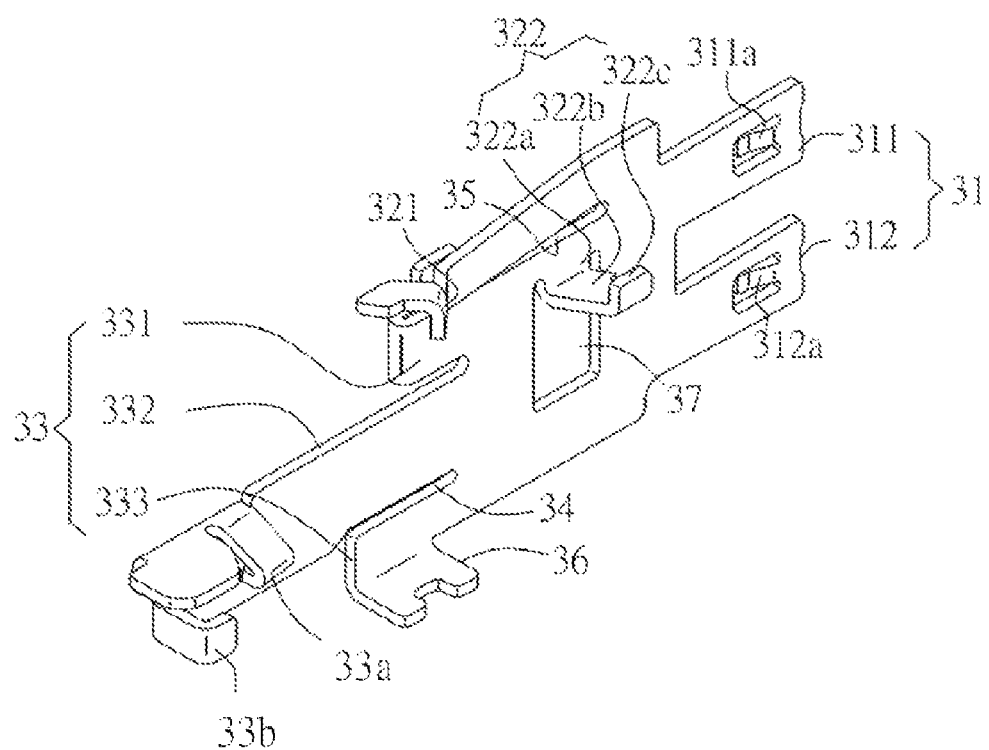
FIG. 1 is a three-dimensional view of a latch member of a double-layer card edge connector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Figure 2:
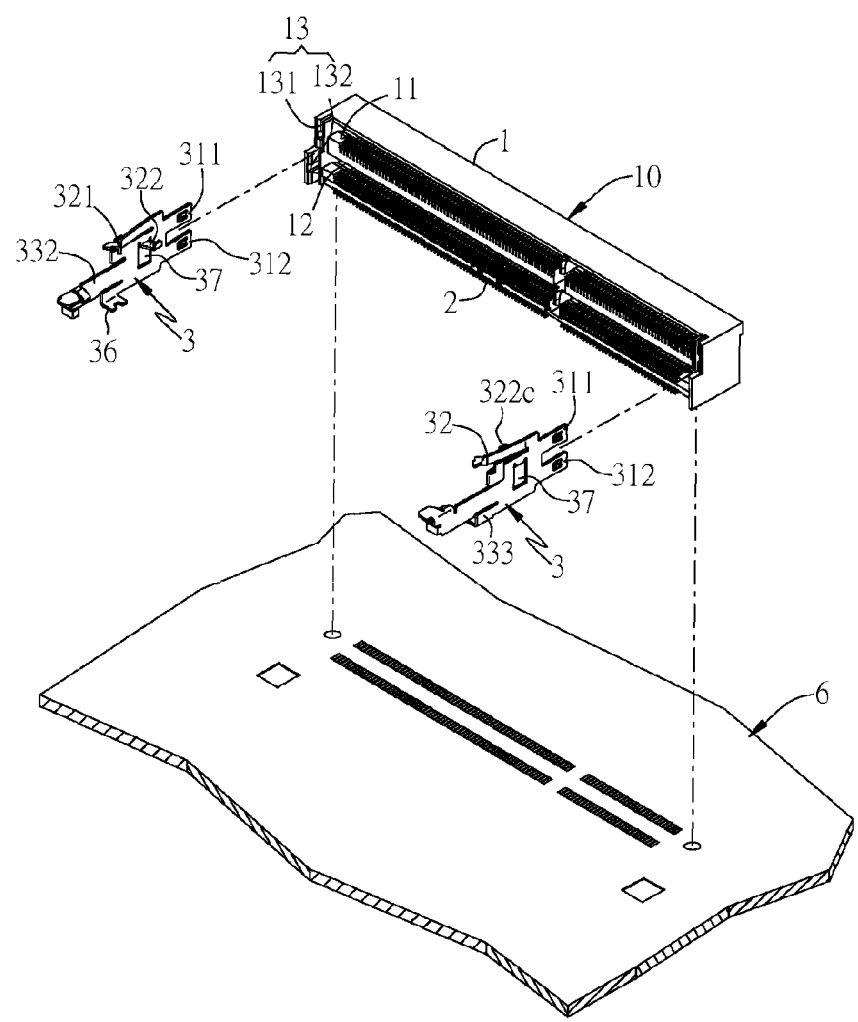
FIG. 2 is an exploded three-dimensional view of a double-layer card edge connector according to the embodiment of the present invention.
Figure 4:
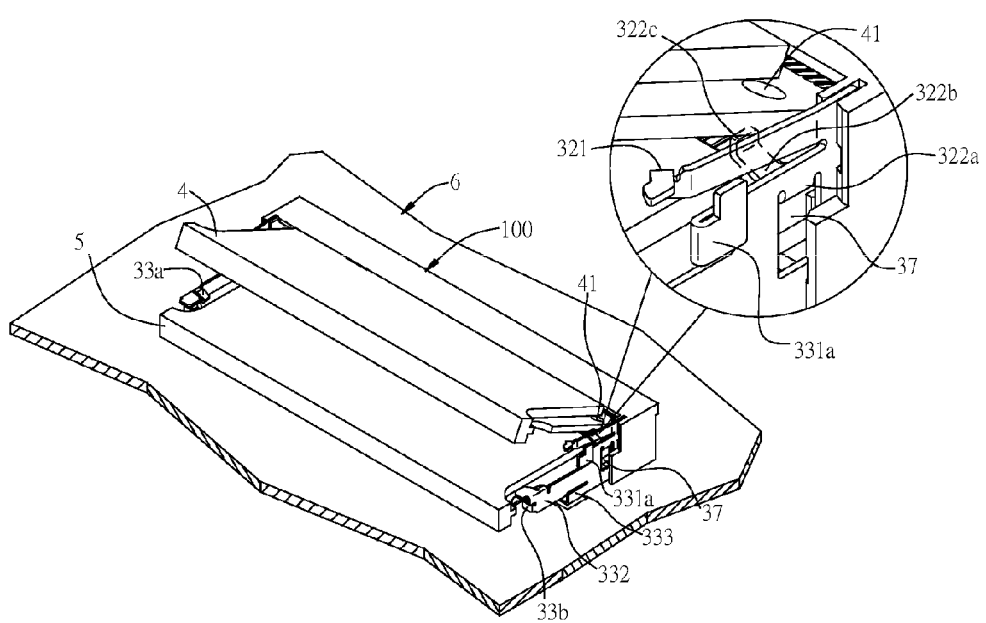
FIG. 4 is a schematic view of a first electronic card inserted in a double-layer card edge connector according to the embodiment of the present invention.

Referring to FIG. 2 and FIG. 4, a double-layer card edge connector 100 according to one embodiment of the present invention have a one-piece metal latch member 3, which is used to be soldered to a circuit board 6 for receiving a first electronic card 4 and a second electronic card 5 therein, so that the first electronic card 4 and the second electronic card 5 are electrically connected to the circuit board 6 through the double-layer card edge connector 100.

Figure 3:
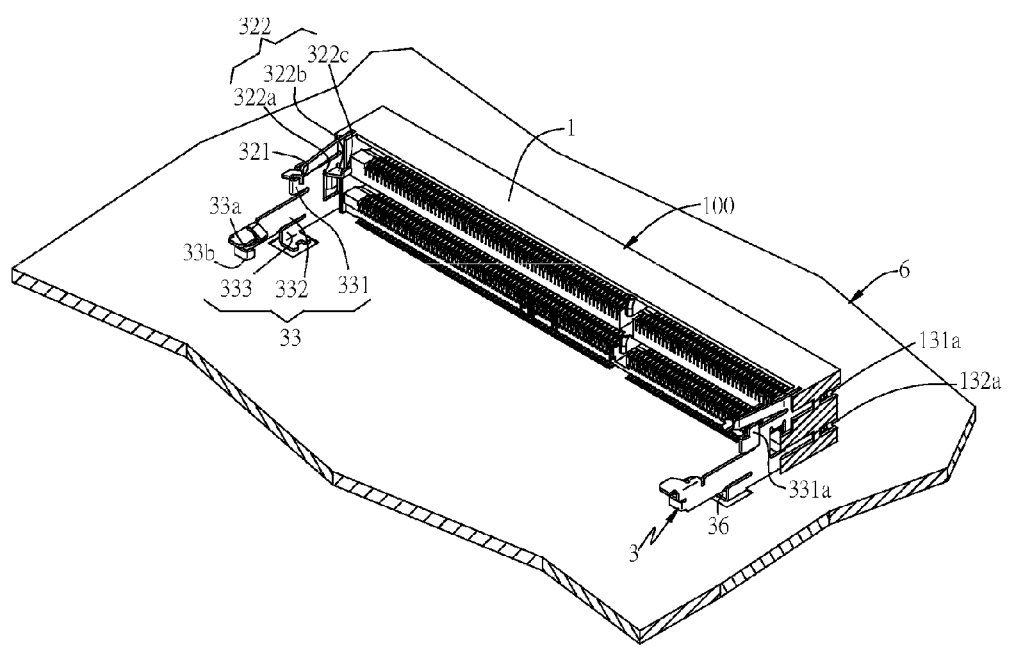
FIG. 3 is a three-dimensional view of a double-layer card edge connector mounted on a circuit board according to the embodiment of the present invention.

Referring to FIG. 3, the double-layer card edge connector 100 includes an electrical connection base 10, and two latch members 3 symmetrically disposed at two ends of the electrical connection base 10 for stopping and fixing the first electronic card 4 and the second electronic card 5. Alternatively, the present invention is not limited thereto, and it may also be that only one latch member 3 is fixed at one end of the electrical connection base 10.

Referring to FIGS. 2-4, the electrical connection base 10 includes an insulating body 1 of a rectangular shape. A first slot 11 and a second slot 12 are formed along a lengthwise direction of the insulating body 1 for respectively receiving and fixing the first electronic card 4 and the second electronic card 5 therein. The first slot 11 is located above the second slot 12, so that the first slot 11 and the second slot 12 are disposed in an upper-lower manner. Multiple terminals 2 are disposed at upper and lower sides of the first slot 11 and the second slot 12, so as to connect the first electronic card 4 and the second electronic card 5 to the circuit board 6. An accommodating groove 13 is respectively recessed at each of two ends of the insulating body 1, and the present invention is not limited thereto. Alternatively, when the double-layer card edge connector 100 has only one latch member 3, only one accommodating groove 13 needs to be recessed at one end of the insulating body 1. In this embodiment, the accommodating groove 13 includes a first accommodating groove 131 and a second accommodating groove 132, which are disposed at an interval and used together for fixing the latch member 3. Further, a first reserved groove 131a and a second reserved groove 132a are respectively recessed on side walls of the first accommodating groove 131 and the second accommodating groove 132, and are used for preventing the latch member 3 from moving forward to escape from the first accommodating groove 131 and the second accommodating groove 132.

Referring to FIG. 1 and FIG. 2, the latch member 3 is a one-piece metal member structure integrally formed by stamping and forming a metal plate. Each of the latch members 3 includes a fixing end 31 fixed inside the electrical connection base 10, and a first main arm 32 and a second main arm 33 extend forward from the fixing end 31 from top to bottom in sequence.

Referring to FIG. 1, the fixing end 31 includes a first fixing portion 311 and a second fixing portion 312 arranged in an upper-lower manner, which are respectively inserted and fixed in the first accommodating groove 131 and the second accommodating groove 132. Definitely, the present invention is not limited thereto. Whether the fixing end 31 has the first fixing portion 311 and the second fixing portion 312 at the same time is determined according to specific design requirements. Alternatively, the first fixing portion 311 and the second fixing portion 312 may be integrated into one fixing portion.

Referring to FIGS. 1-3, in this embodiment, the size of the first accommodating groove 131 is slightly greater than that of the first fixing portion 311, so that the first fixing portion 311 and the first accommodating groove 131 are in clearance fit. Thus, the first fixing portion 311 can float in three dimensional directions in the first accommodating groove 131. Apparently, as upper, lower, left and right wall surfaces of the first accommodating groove 131 have a blocking effect on the first fixing portion 311, the free floating movement of the first fixing portion 311 in the first accommodating groove 131 in up, down, left and right directions is limited. At the same time, in order to prevent the first fixing portion 311 departing from the first accommodating groove 131 due to excessive forward floating, the first fixing portion 311 is pierced to form a first latch 311a. A free end of the first latch 311a is exposed at a side of the first fixing portion 311, and further enters the first reserved groove 131a and is in clearance fit with the first reserved groove 131a. When the forward floating movement of the first fixing portion 311 is great, the free end of the first latch 311a pushes against a front wall of the first reserved groove 131a, so as to prevent excessive forward floating of the first fixing portion 311.

Similarly, the size of the second accommodating groove 132 is slightly greater than that of the second fixing portion 312, so that the second fixing portion 312 and the second accommodating groove 132 are in clearance fit. Thus, the second fixing portion 312 can float in three dimensional directions in the second accommodating groove 132. Apparently, as upper, lower, left and right wall surfaces of the second accommodating groove 132 have a blocking effect on the second fixing portion 312, the free floating movement of the second fixing portion 312 in the second accommodating groove 132 in up, down, left and right directions is limited. In order to prevent the second fixing portion 312 departing from the second accommodating groove 132 due to excessive forward floating, the second fixing portion 312 is pierced to form a second latch 312a. A free end of the second latch 312a is exposed at a side of the second fixing portion 312, and further enters the second reserved groove 132a and is in clearance fit with the second reserved groove 132a. When the forward floating movement of the second fixing portion 312 is great, the free end of the second latch 312a pushes against a front wall of the second reserved groove 132a, so as to prevent excessive forward floating of the second fixing portion 312.

Figure 5:
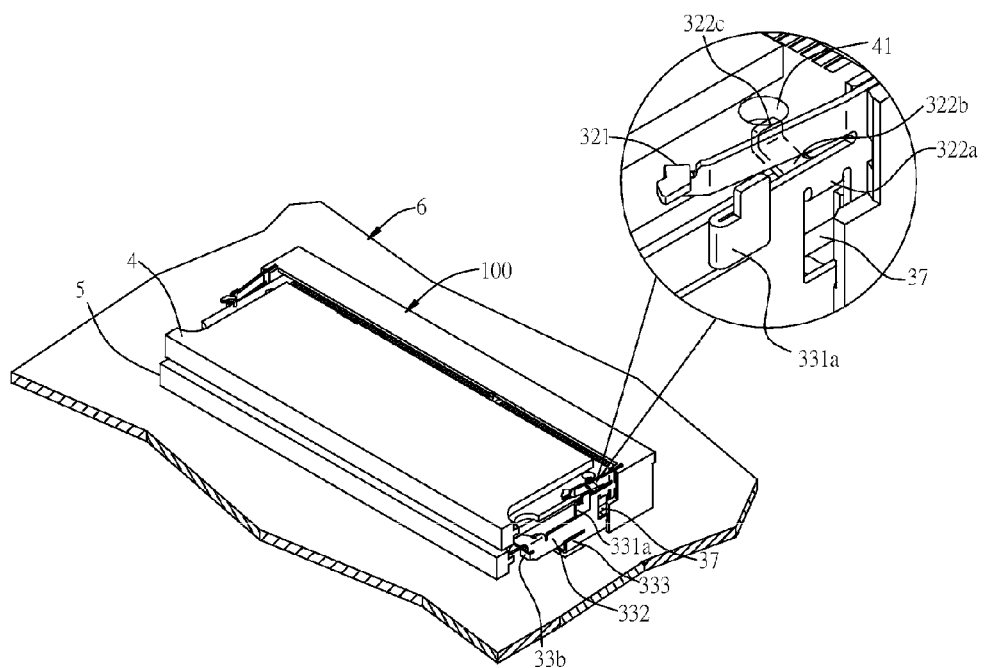
FIG. 5 is a schematic view of a first electronic card inserted and fixed in a double-layer card edge connector according to the embodiment of the present invention.

Referring to FIG. 1, FIG. 4 and FIG. 5, in the embodiment of the present invention, in order to prevent an interference between the second electronic card 5 and the first main arm 32, usually the first main arm 32 is designed to be short, making the first main arm 32 so short that the free end of the first main arm 32 cannot reach an arc notch on a side edge of the first electronic card 4. Thus, a structure cannot be disposed on the free end of the first main arm 32 to enter the arc notch on the side edge of the first electronic card 4 to prevent the first electronic card 4 from moving forward. Therefore, the first main arm 32 and the second main arm 33 are different in structure.

In addition, as the first main arm 32 is designed to be short, in order to ensure the elasticity of the first main arm 32, usually a first slit 35 is disposed between the first main arm 32 and the second main arm 33, so that an elastic arm of the first main arm 32 is long and has good elasticity. In this way, the first main arm 32 does not easily get fatigue.

The structures of the first main arm 32 and the second main arm 33 are described in detail below.

Figure 6:
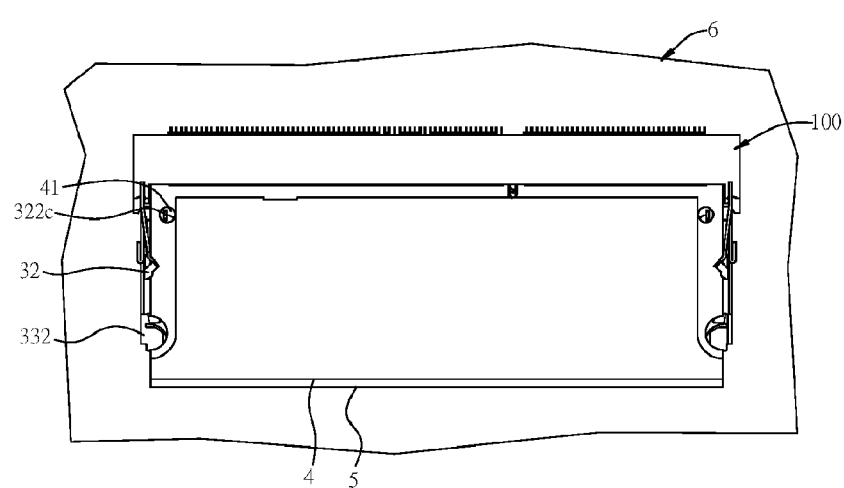
FIG. 6 is a top view of FIG. 5.
Figure 7:
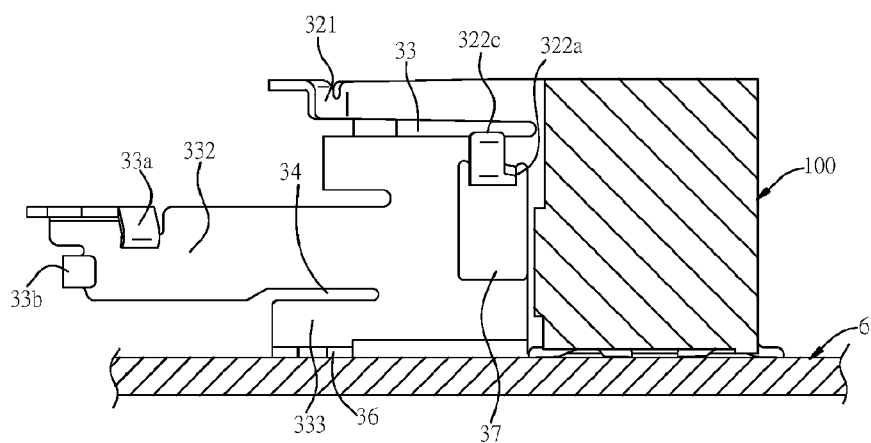
FIG. 7 is a sectional side view of FIG. 3.

Referring to FIG. 1, FIG. 6 and FIG. 7, the first main arm 32 includes a first downward pressing portion 321 disposed at the free end of the first main arm 32 and pressing the first electronic card 4, and a first clamping portion 322 formed through piecing, bending and extending the second main arm 33 and located behind the first downward pressing portion 321. The first clamping portion 322 is clamped in the first electronic card 4, so as to prevent the first electronic card 4 from moving forward. Thus, the first electronic card 4 is stopped and fixed between the two first main arms 32.

Referring to FIG. 1, FIG. 4 and FIG. 5, the second main arm 33 includes a second downward pressing portion 33a and a second clamping portion 33b disposed at the free end of the second main arm 33. The second downward pressing portion 33a presses the second electronic card 5 downward, and the second clamping portion 33b is clamped in an arc notch at a side edge of the second electronic card 5, so as to prevent the second electronic card 5 from moving forward. Thus, the second electronic card 5 is stopped and fixed between the two second main arms 33.

Referring to FIG. 1, FIG. 6 and FIG. 7, in this embodiment, the second main arm 33 includes an upper extending plate 331 and a blocking arm 332 distributed in an upper-lower manner. The blocking arm 332 and the upper extending plate 331 are pierced to form the first clamping portion 322 and a through hole 37, in which the through hole 37 is formed through the blocking arm 332 and the upper extending plate 331. The first clamping portion 322 is formed through extending from the upper extending plate 331 along an upper edge of the through hole 37 toward the other end of the electrical connection base 10 and then extending upward. The first clamping portion 322 includes a root portion 322a connected to the upper edge of the through hole 37, a connecting portion 322b formed through extending from the root portion 322a toward the other end of the electrical connection base 10, and a positioning portion 322c formed through extending upward from the connecting portion 322b. The root portion 322a is stamped from the through hole 37 and has a smaller width than that of the through hole 37, so that to prevent the root portion 322a from breakage at the upper edge of the through hole 37 due to centralized stress. The positioning portion 322c is fitted to a positioning hole 41 of the first electronic card 4, so as to prevent the first electronic card 4 from moving forward. In addition, the positioning portion 322c gradually shrinks from bottom to top, so as to guide the positioning hole 41 to be fitted to the positioning portion 322c.

Referring to FIG. 1, in this embodiment, as the second downward pressing portion 33a and the second clamping portion 33b are both disposed at the free end of the blocking arm 332, the second electronic card 5 is stopped and fixed between two blocking arms 332. The free end of the first main arm 32 is located closer to the electrical connection base 10 than the free end of the blocking arm 332 is, so that the first main arm 32 and the blocking arm 332 are arranged in a front-rear manner, so as to ensure that the second electronic card 5 is always below the first main arm 32 during insertion and withdrawal, thereby preventing the interference between the second electronic card 5 and the first main arm 32.

Referring to FIG. 1, FIG. 2 and FIG. 4, in this embodiment, in order to further consider the strength of the first main arm 32 during deformation, the upper extending plate 331 extends forward, and then is bent backward and extends to form a bent blocking arm 331a. A tail end of the bent blocking arm 331a is higher than a lower edge of the first main arm 32 and is located at an outer side of the first main arm 32. When an operator pulls the two first main arms 32 to release the first electronic card 4 between the two first main arms 32, the two first main arms 32 expand outward and push against the bent blocking arm 331a. The bent blocking arms 331a prevent the first main arms 32 from expanding outward excessively and getting fatigue.

Referring to FIG. 1 and FIG. 3, in this embodiment, the second main arm 33 further includes a lower extending plate 333 located below the blocking arm 332. A second slit 34 exists between the lower extending plate 333 and the blocking arm 332, so that the blocking arm 332 has a long elastic arm and good elasticity. A lower edge of the lower extending plate 333 extends in a horizontal direction to form a soldering portion 36, which is substantially parallel to the horizontal plane and fixed to the circuit board 6 by soldering. It should be noted that, according to requirements of the length of the first clamping portion 322, the first clamping portion 322 may be formed through piercing the upper extending plate 331, the blocking arm 332 and the lower extending plate 333.

Referring to FIG. 3 to FIG. 5, a process of fixing the first electronic card 4 and the second electronic card 5 to the electrical connection base 10 is described as follows.

First, the first electronic card 4 and the second electronic card 5 are correspondingly inserted in the first slot 11 and the second slot 12 at a slanting angle, and ends of the first electronic card 4 and the second electronic card 5 away from the insulating body 1 are inclined upward.

Then, the second electronic card 5 is pressed downward, so that the two blocking arms 332 expand outward and the second electronic card 5 enters between the two blocking arms 332. The second downward pressing portion 33a presses the second electronic card 5 to prevent the second electronic card 5 from rotating upward. At the same time, the second clamping portion 33b enters the arc notch of the second electronic card 5 and pushes against the edge of the arc notch, so as to prevent the second electronic card 5 from moving forward. Thus, the second electronic card 5 is stopped and fixed between the two blocking arms 332.

Then, when the first electronic card 4 is pressed downward to make the two first main arms 32 expand outward, the first electronic card 4 enters between the two first main arms 32. The first downward pressing portion 321 presses the first electronic card 4 to prevent the first electronic card 4 from rotating. The positioning portion 322c of the first clamping portion 322 enters the positioning hole 41 to prevent the first electronic card 4 from moving forward. Thus, the first electronic card 4 is stopped and fixed between the two first main arms 32.

It should be noted that, the sequence of inserting and pressing the first electronic card 4 and the second electronic card 5 is not limited, and the sequence in the above description is merely for the convenience of illustration.

Based on the above, the double-layer card edge connector 100 of the present invention, among other things, has the following beneficial effects.

1. Simple yet novel structure and low cost. In the embodiment of the present invention, the latch member 3 stops and fixes the first electronic card 4 through the following structure: the first downward pressing portion 321 is disposed at the free end of the first main arm 32 to press the first electronic card, and a first clamping portion 322 formed through extending from the second main arm 33 and located behind the first downward pressing portion 321 is clamped in the first electronic card 4, so as to prevent the first electronic card 4 from moving forward. Meanwhile, the latch member 3 stops and fixes the second electronic card 5 through the following structure: the second downward pressing portion 33a and the second clamping portion 33b are disposed at the free end of the second main arm 33 to respectively press the second electronic card 5 downward, and prevent the second electronic card 5 from moving forward. As described above, the latch member 3 adopts a one-piece metal member structure, which has a simple yet novel structure while ensuring that the first electronic card 4 and the second electronic card 5 are stopped and fixed. In addition, as the latch member 3 can be integrally formed simply by stamping and forming a metal plate during manufacturing, the cost is low.

2. Material saving. As the first clamping portion 322 is formed through piercing the second main arm 33, the first clamping portion 322 does not use any other material than the second main arm 33. Therefore, the first clamping portion 322 does not consume extra material.

3. Long service life. To ensure the elasticity of the first main arm 32, the first slit 35 is formed between the first main arm 32 and the second main arm 33, so that when the operator pulls the two first main arms 32 outward to release the first electronic card 4 between the two first main arms 32, the two first main arms 32 easily undergo bending deformation due to good elasticity. When the two first main arms 32 push against the bent blocking arm 331a due to great outward bending deformation, the bent blocking arm 331a prevents the two first main arms 32 from undergoing excessive outward deformation. As such, the two first main arms 32 do not easily get fatigue due to excessive deformation that shortens the service life.

4. Convenient to assemble. When the first electronic card 4 is pressed downward and fixed between the two first main arms 32, and the positioning portion 322c enters the positioning hole 41. As the positioning portion 322c gradually shrinks from bottom to top, the positioning portion 322c guides the positioning hole 41 to be gradually fitted to the positioning portion 322c.

5. Convenient to solder. As the first fixing portion 311 and the second fixing portion 312 are respectively in clearance fit with the first accommodating groove 131 and the second accommodating groove 132, the entire latch member 3 can float in three dimensional directions relative to the insulating body 1. Thereby, the height of the soldering portion 36 at the lower end of the latch member 3 can be adjusted, so that coplanarity of the soldering portion 36 of the latch member 3 and the soldering portion (not shown) of the terminal 2 is good, thereby facilitating soldering.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A double-layer card edge connector, for receiving a first electronic card and a second electronic card therein, comprising:
   (a) an electrical connection base, formed with a first slot and a second slot from top to bottom in sequence for respectively receiving and fixing the first electronic card and the second electronic card therein; and
   (b) at least one latch member made of a single piece of material, fixed at one end of the electrical connection base, wherein the latch member comprises a fixing end fixed inside the electrical connection base, a first main arm and a second main arm extend forward from the fixing end from top to bottom in sequence, a first slit exists between the first main arm and the second main arm, and a free end of the first main arm is located closer to the electrical connection base than a free end of the second main arm; wherein
      the first main arm comprises a first downward pressing portion disposed at the free end of the first main arm and pressing the first electronic card downward, and a first clamping portion formed through extending from the second main arm and located behind the first downward pressing portion, and the first clamping portion is clamped in the first electronic card to prevent the first electronic card from moving forward; and
      the second main arm comprises a second downward pressing portion and a second clamping portion disposed at the free end of the second main arm, the second downward pressing portion presses the second electronic card downward, and the second clamping portion is clamped in the second electronic card to prevent the second electronic card from moving forward.

2. The double-layer card edge connector according to claim 1, wherein the second main arm comprises an upper extending plate and a blocking arm distributed in an upper-lower manner, the free end of the first main arm is located closer to the electrical connection base than a free end of the blocking arm is, and the second downward pressing portion and the second clamping portion are both disposed at the free end of the blocking arm.

3. The double-layer card edge connector according to claim 2, wherein the upper extending plate extends forward, and then is bent backward and extends to form a bent blocking arm, and a tail end of the bent blocking arm is higher than a lower edge of the first main arm and is located at an outer side of the first main arm, so as to prevent the first main arm from being bent outward excessively.

4. The double-layer card edge connector according to claim 2, wherein a through hole is formed through the blocking arm and the upper extending plate, the first clamping portion for stopping the first electronic card is formed through extending from the upper extending plate along an upper edge of the through hole toward the other end of the electrical connection base and then extending upward, and the first clamping portion comprises a root portion connected to the upper edge of the through hole, a connecting portion formed through extending from the root portion toward the other end of the electrical connection base, and a positioning portion extending upward from the connecting portion.

5. The double-layer card edge connector according to claim 4, wherein the root is stamped from the through hole and has a smaller width than that of the through hole.

6. The double-layer card edge connector according to claim 1, wherein the first clamping portion is fitted to a positioning hole of the first electronic card, so as to prevent the first electronic card from moving forward.

7. The double-layer card edge connector according to claim 4, wherein the positioning portion gradually shrinks from bottom to top, so as to guide the positioning hole of the first electronic card to be fitted to the positioning portion.

8. The double-layer card edge connector according to claim 1, wherein there are two latch members symmetrically disposed at two ends of the electrical connection base.

9. The double-layer card edge connector according to claim 2, wherein the second main arm further comprises a lower extending plate below the blocking arm, a second slit is defined between the lower extending plate and the blocking arm, and a lower edge of the lower extending portion extends in a horizontal direction to form a soldering portion.

10. The double-layer card edge connector according to claim 1, wherein the fixing end comprises a first fixing portion and a second fixing portion arranged in an upper-lower manner, an end of the electrical connection base is disposed with a first accommodating groove and a second accommodating groove for respectively receiving and fixing the first fixing portion and the second fixing portion, the first fixing portion and the first accommodating groove are in clearance fit, and the second fixing portion and the second accommodating groove are in clearance fit.

* * * * *